Feb. 15, 1927.

G. A. BOUVIER 1,617,938

METHOD OF AND APPARATUS FOR DETERMINING THE PLIABILITY OF STRANDS

Filed April 9, 1925

Inventor
George A. Bouvier
by H. A. Patterson
Att'y.

Patented Feb. 15, 1927.

1,617,938

UNITED STATES PATENT OFFICE.

GEORGE ALFRED BOUVIER, OF OAK PARK, ILLINOIS, ASSIGNOR TO WESTERN ELECTRIC COMPANY, INCORPORATED, OF NEW YORK, N. Y., A CORPORATION OF NEW YORK.

METHOD OF AND APPARATUS FOR DETERMINING THE PLIABILITY OF STRANDS.

Application filed April 9, 1925. Serial No. 21,793.

This invention relates to a method of and apparatus for determining the pliability of strands and has for its main objects the provision of an improved and simplified method of and apparatus for readily and accurately determining the pliability of a strand.

According to the main features of the invention the strand to be tested is suspended in a vertical position and a pendular motion imparted thereto, the motion of the strand causing a flexing thereof at the point at which it is suspended. The pliability of the strand is then determined by the dampening effect on the pendular motion, which is caused by the flexing of the strand.

One embodiment of the apparatus which may be used in practicing the method includes a pendular member, approaching in its operation, an ideal pendulum, to which the strand to be tested may be attached so that it will have a predetermined tension throughout its length and will be flexed upon the same axis as that on which the pendular member swings. An arcuate member paralleling the arcuate path of the tip of the pendular member is provided with suitable graduations for gauging the dampening effect on the member of the attached strand.

The invention will be more fully understood from the following description with the accompanying drawings, in which—

It is believed that the main steps of the method will be understood from a description of the apparatus with which it may be practiced.

Figure 1:
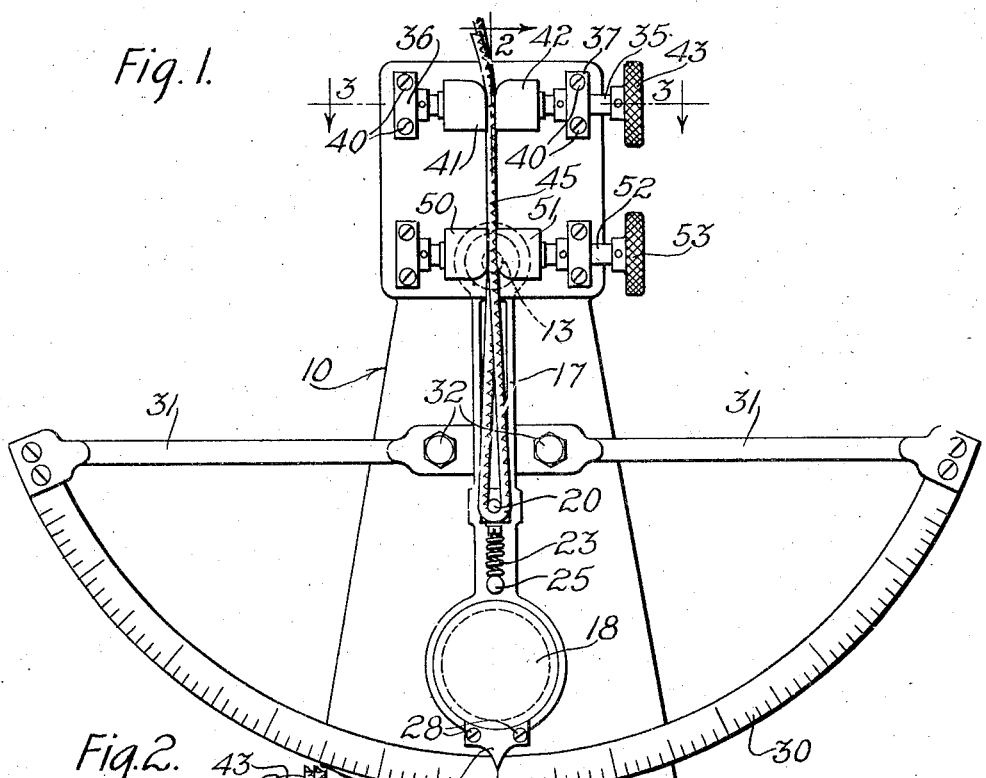
Fig. 1 is a front elevation of a mechanism embodying the main features of the invention and which may be used in performing the steps of the process.
Figure 2:
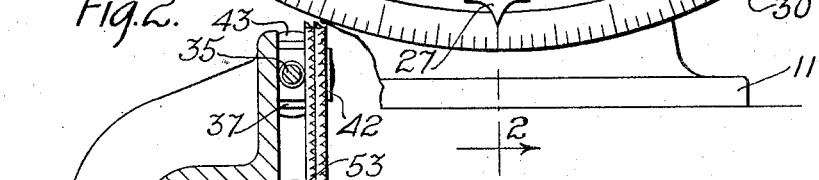
Fig. 2 is a section taken on the line 2—2 of Fig. 1 looking in the direction of the arrows.
Figure 2:
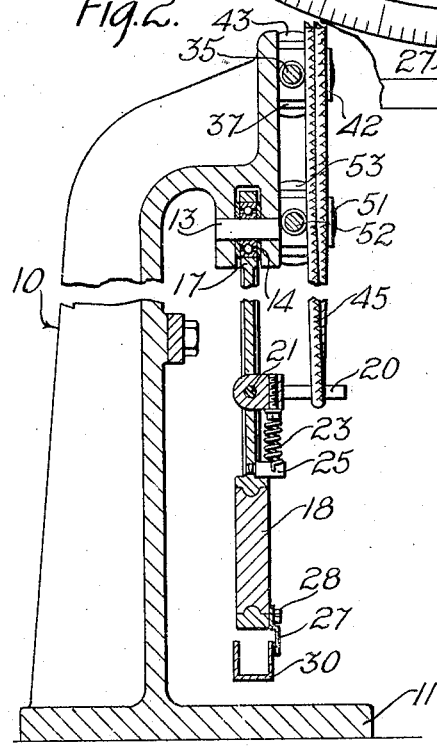

Referring now to the accompanying drawings in which like numerals are employed to designate similar members throughout the several views, a main frame 10 is flared at the lower portion thereof to form a base plate 11 upon which the mechanism is supported. At the upper portion of the main frame 10 a pin 13 inserted through a bifurcated portion thereof passes through the interior race 14 of a ball bearing, the outer race 15 thereof being securely fitted, in any suitable manner, within a cylindrical opening at one end of a pendular member 17. A ring like portion in the lower end of the pendular member 17 encircles a body 18 of heavier metal, such as lead. A stud member 20 is pivoted on a pin 21 and is pulled in a downward direction by a coil spring 23 which is secured thereto and to a projecting portion 25 upon the pendular member 17. An indicating tip 27 is secured by suitable means, such as screws 28, to the lower portion of the pendular member 17. An arcuate member 30 bearing suitable graduations as shown in Fig. 1 is supported by an arm 31 which is secured to the main frame 10 by suitable means such as machine screws 32. The tip 27 and the graduations on the member 30, cooperate to indicate the flexibility of the cord in a manner to be more fully pointed out hereinafter.

Figure 3:
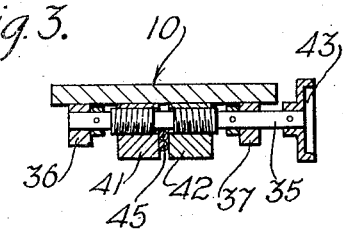
Fig. 3 is a section taken on the line 3—3 of Fig. 1.

A screw shaft 35 is journaled in bearings 36 and 37 which are secured to the main frame 10 by machine screws 40. A portion of the screw shaft 35 is threaded with a right hand thread into a slidable jaw 41 and another portion thereof is threaded by means of a left hand thread into a slidable jaw 42. In this manner the two jaws 41 and 42 may be brought together or separated by turning the shaft 35 by means of a knob 43 which is secured at one end thereof. The jaws 41 and 42 are adapted to grip a strand 45 as shown particularly in Fig. 1. Therefrom the strand passes through a pair of anvils 50 and 51 which are adjustable on a screw shaft 52 which is turned by means of a knob 53, the action of the shaft 52 and the anvils 50 and 51 being identical with that described above for the screw shaft 35 and the jaws 41 and 42 and shown in detail section in Fig. 3. The anvils 50 and 51 are so positioned, however, that when the strand 45 is placed in position as shown in Fig. 1 and the pendular member is set in motion, the strand will be flexed about approximately the same axis as that on which the pendular member swings.

When testing strands by means of the apparatus shown the strand is doubled and the doubled end thereof passed around the stud member 20. The stud member is then pulled to a horizontal position against the action of the spring 23 and the upper portion of the strand is then gripped securely between the jaws 41 and 42. A uniform tension is thus imparted to the strand throughout that part of its length which is in engagement with the apparatus. This insures a uniform condition in the strand, the resilient character of the stud member 20 acting to compensate for the shortening of the span of the strand due to the bending thereof. The knob 53 is then turned until the anvils 50 and 51 just grip the strand so as to insure its bending in the proper place. The member 17 is then brought to an upper position along the arcuate member 30 and allowed to drop, this action imparting a pendular motion thereto.

A theoretical or perfect pendulum which the member 17 approaches, will continue to swing independently in an undiminished arc, but it is apparent that where each swing of the pendulum flexes a strand, the pliability of which is being tested as in the present instance, the dampening effect of the strand will result in a diminution in the length of the arc for every oscillation which the pendulum makes. When testing the strand, the pendulum can be allowed to make a single swing in one direction or one complete swing or excursion from and to the starting position and the dampening effect noted in either case, or it may be permitted to make a number of swings and the total dampening effect then observed. A still further possibility is to permit the pendulum to swing until it comes to a stationary position and record either in time or number of oscillations the duration of the pendular action. It is to be noted that where the pendulum makes a number of swings with the strand, the dampening effect of the strand is the difference in the arc with the pendulum swinging freely and when swinging with the strand, for the given number of oscillations. Where the same type of strand is being tested repeatedly, a standard test may be developed which, if carried out properly, may be used to determine with accuracy the relative pliability of various strands. The method is of particular advantage in testing electrical conductors such as telephone cords, and especially that class of telephone cords which are produced by spiralling copper tinsel on fibrous strands and then braiding cotton coverings over the resulting flexible conductor.

Although the apparatus shown in the accompanying drawing is the preferred form thereof, it is apparent that other embodiments thereof may be employed. The invention is, therefore, not to be limited by the details of the apparatus shown and described, but only as set out in the appended claims.

What is claimed is:

1. A method of testing the pliability of a strand which consists in flexing the strand a plurality of times within a restricted section thereof, and indicating by sensible means the aggregate effort required to flex said strand said plurality of times.

2. A method of testing the pliability of a strand which consists in gripping the strand, imparting a pendular motion thereto, and measuring the dampening effect on the pendular motion caused by the flexing of the strand in the region in which it is gripped.

3. A method of testing the pliability of a strand which consists in suspending the strand vertically, securely gripping a vertical portion of said strand, imparting a pendular motion to the suspended portion thereof, and measuring the dampening effect on the pendular motion caused by the flexing of the strand in the region in which it is gripped.

4. A method of testing the pliability of a strand which consists in suspending the strand vertically, securely gripping a vertical portion of said strand, imparting a pendular motion to the pendant portion thereof, and measuring the decrease in arc of the pendant portion per oscillation thereof.

5. A method of determining the pliability of a strand, which consists in attaching the strand to a mass of predetermined weight, swinging the mass and attached strand around an axis and determining the dampening effect produced by the attached strand upon the movement of the mass.

6. A method of determining the pliability of a strand, which consists in swinging a mass of predetermined weight about an axis, noting the extent of the excursions thereof, attaching a strand to the mass and noting the change in the excursions of the mass.

7. A method of determining the pliability of a strand, which consists in attaching the strand to an element capable of being given a pendular motion, imparting a pendular motion thereto to flex the strand, and determining the diminution in the motion of the element caused by the flexing of the strand.

8. A method of determining the pliability of a strand, which consists in attaching the strand to an element capable of being given a pendular motion, placing the strand under a predetermined tension, imparting a pendular motion to the element to flex the strand, and determining the diminution in the motion of the element caused by the flexing of the strand.

9. In an apparatus for testing strands, a swinging member, means for securing a strand to said swinging member at a point removed from the pivot thereof, and means for gripping the strand in alignment with said pivot and thereby causing the strand to flex upon the same axis as that upon which the swinging member pivots.

10. In an apparatus for testing strands, a swinging member, means for securing a strand to said swinging member at a point removed from the pivot thereof to cause the swinging of the member to flex the strand, and means for maintaining a portion of the strand stationary at a point in alignment with said pivot and thereby imparting a uniform tension to the swinging portion of the strand.

11. In an apparatus for testing strands, a pendular member, a resiliently mounted member on said pendular member, and means for securing the strand in position on the pendular member so that a doubled portion thereof is looped around, and is held taut by, the resiliently mounted member.

12. In an apparatus for testing strands, a pendular member, a resilient member mounted on said pendular member, means for securing the strand in position on the pendular member so that a doubled portion thereof is looped around, and is held taut by, the resilient member, and an arcuate member with graduations thereon adapted to cooperate with the tip portion of the pendular member to indicate the length of the arc in which the pendular member swings.

13. In an apparatus for testing strands, a pendular member, a resiliently mounted member on said pendular member, means for securing the strand in position on the pendular member so that a doubled portion thereof is looped around, and is held taut by, the resiliently mounted member, and means for causing the strand to flex upon the same axis as that upon which the pendular member pivots, when motion is imparted to said member.

14. In an apparatus for testing strands, a pendular member, a resiliently mounted member on said pendular member, means for securing the strand in position on the pendular member so that a doubled portion thereof is looped around, and is held taut by, the resiliently mounted member, means for causing the strand to flex upon the same axis as that upon which the pendular member pivots, when motion is imparted to said member, and an arcuate member with graduations thereon adapted to cooperate with the tip portion of the pendular member to indicate the length of the arc in which the pendular member swings.

In witness whereof, I hereunto subscribe my name this 31st day of March A. D., 1925.

GEORGE ALFRED BOUVIER.